United States Patent Office 2,787,158
Patented Apr. 2, 1957

2,787,158

STATIC SCANNING DEVICE IN ULTRASONIC INSPECTION OF MATERIALS

Howard E. Van Valkenburg, Candlewood Isle, and Edward G. Cook, Brookfield, Conn., assignors to Sperry Products, Inc., Danbury, Conn., a corporation of New York Application July 23, 1953, Serial No. 369,876

4 Claims. (Cl. 73—67.5)

This invention relates to the ultrasonic inspection of materials for internal defects. More particularly the invention has for its object not only the detection of such defects but the production of a two-dimensional image giving the height and width of the defect. Various methods for producing such an image have heretofore been proposed, but all of them have been subject to difficulties and disadvantages. For example, it has been proposed to scan the area of the object under test with an acoustic beam by means of a mechanically moved crystal or mosaic of crystals, but the disadvantages of moving scanning systems reside in the fact that there are moving parts which are difficult to operate at high rates of scanning and also that the scanning mechanism must be aligned relative to the object under inspection. It is therefore one of the principal objects of this invention to provide an ultrasonic inspection system which will produce an acoustic image of the interior of the test material without the necessity of employing moving scanning mechanisms or a mosaic of crystals, and which will nevertheless produce instantaneously an acoustic image of the interior of the material.

Further objects and advantages of this invention will become apparent in the following detailed description thereof.

In the accompanying drawings.

Figure 1:
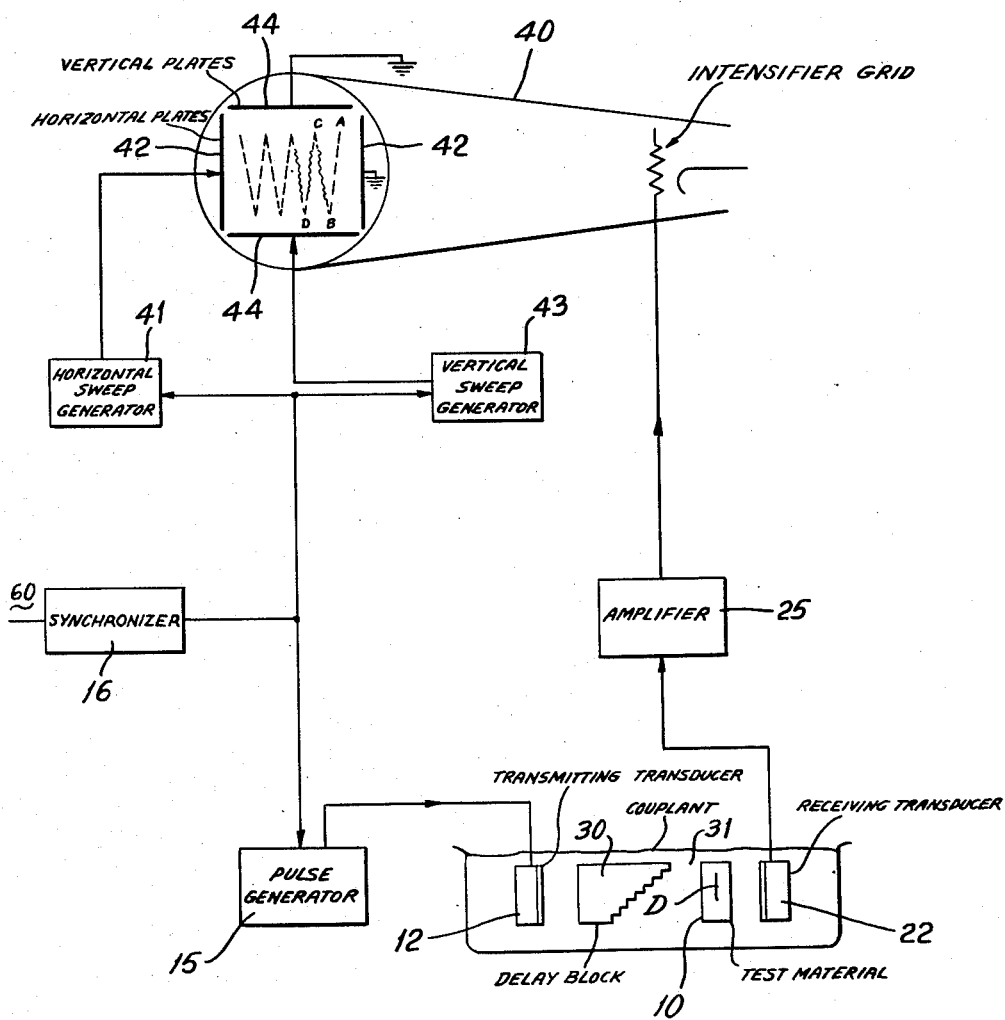
Fig. 1 is an assembly view, including a wiring diagram and with the mechanical parts shown diagrammatically, of one embodiment of this invention.
Figure 2:
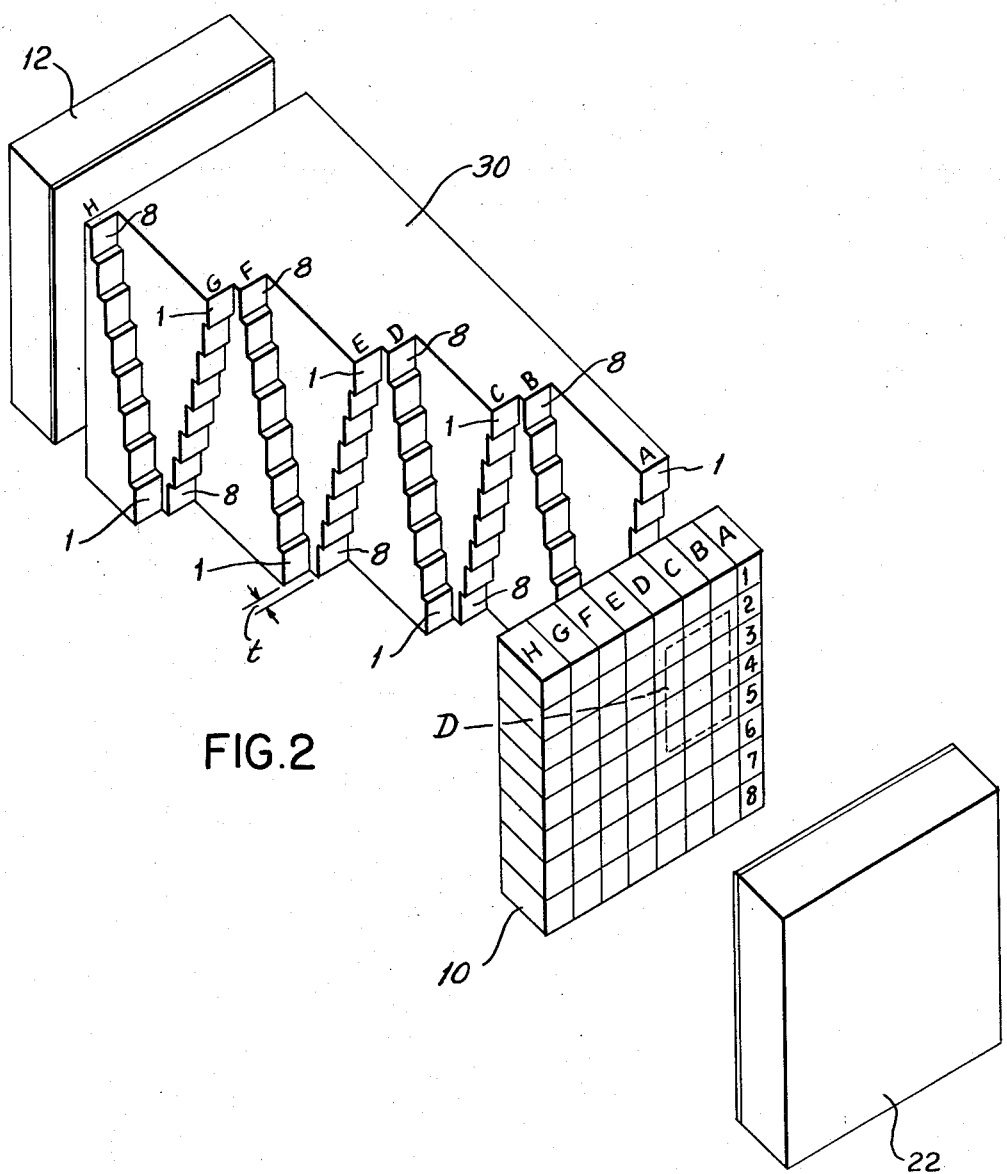
Fig. 2 is an isometric projection of the component units of the acoustic scanning mechanism of Fig. 1.

Referring to the drawings, there is illustrated an object 10 whose interior is to be ultrasonically inspected and reproduced as an acoustic image. For this purpose there is provided a transmitting electro-acoustic transducer 12 which may be periodically energized by wave trains or pulses from a pulse generator 15 which is tripped by a synchronizer 16 which may be energized from any suitable source of energy such as sixty-cycle A. C. so that sixty times per second the transducer 12 will transmit toward the object 10 wave trains of predetermined duration. In order to obtain an image of an internal defect such as the area D within object 10, the pulses transmitted by transducer 12 may be reflected from any reflecting surfaces of the object 10 including the front and rear surfaces of said object and any internal reflecting surfaces such as the fissure D, or such pulses may be transmitted through the object 10 and be received by a receiving electro-acoustic transducer 22. In the latter case, if no defect is present, the maximum energy will be transmitted through object 10 and be received by transducer 22, while if there is an internal reflecting surface such as defect D, the energy transmission will be reduced and the transducer will receive a reduced quantity of energy. The latter system is employed in this embodiment of the invention and is described herein. The quantity of energy received by the transducer 22 may be amplified by an amplifier 25 whose output may be applied to a suitable indicator such as an oscilloscope which would then indicate any diminution in received energy caused by a defect.

In the above described system, if it is desired to obtain an acoustic image of the interior of the object under test which would yield a two-dimensional image of a defect, some type of scanning system must be employed. Heretofore it has been proposed to mount the transmitting transducer for pivotal movement so that the transmitted acoustic beam may be caused to sweep successively across regions of the object 10 in synchronism with an oscilloscope sweep which is moved across the oscilloscope screen so that the variations in transmission or reflection of the transmitted pulses would appear in two dimensions on the screen. Such scanning systems however required moving parts and alignment between the scanning systems and the object and are difficult to operate.

By the present invention scanning is obtained by a static method in which the transmitting and receiving transducers remain stationary but the beam nevertheless strikes the object under inspection in predetermined sequence so as to effect scanning action. This is accomplished by the inter-position of a delay block 30 between the transmitting transducer 12 and the object 10 under test. It will be understood that the transducers, delay block, and object under test are coupled by a suitable acoustic transmitting couplant 31. The material of the delay block is such that the acoustic velocity therein is different from the acoustic velocity in the couplant, and the description herein will assume that the acoustic velocity in the delay block is greater than the acoustic velocity in the couplant. To accomplish the desired result, the delay block 30 has a cross-sectional area in a plane parallel to the plane of transducer 12 substantially equal to said transducer area so that an area of the object under inspection substantially equal to the area of transmitting transducer 12 will be scanned. For effecting scanning of said area by the interposition of delay block 30, one surface of said block in the path of the transmitted beam from transducer 12 is provided with a series of steps arranged in progression from the front face of the block rearwardly so that the distance from transducer 12 to the front of each step is progressively less from front to rear of the block. To provide for effective scanning of the height H and width W of the block, the front of the delay block 30 is subdivided into a plurality of vertical columns A to H inclusive, and each column is divided into a plurality of horizontal steps 1 to 8 inclusive, in the example illustrated, but it will be understood that any number of vertical columns and any number of horizontal steps may be employed for the particular area of object to be tested. Beginning with the column at one extreme side of the delay block, for example column A, each of the steps 1 to 8 is cut back progressively further from the block 10 under test and correspondingly nearer to the transmitting transducer 12. The depth $t$ of each step is chosen such that the time required for the acoustic wave train to travel the distance $t$ in the delay block is equal to or greater than the time duration of the acoustic wave train. At the bottom of column A is found the eighth step which is furthest from test piece 10. The steps in the next column B are cut back beginning with the step adjacent to the lowest step of column A and proceeding rearwardly to the top of column B. Similarly, the steps in column C begin at the upper end, one step back of the rear-most step of column B and move progressively rearwardly to the bottom. Column D moves rearwardly from bottom to top, while column E moves rearwardly from top to bottom. Thus from the first step 1 of column A to the final step 8 of column H, each step represents a delay of one step in the transmission of the pulse generated by transmitter 12, and said transmitted beam will impinge on test piece 10 in successive columns downwardly and upwardly until an area corresponding to the cross-sectional area of the delay block has been traversed. Thus by merely interposing the delay block having the configuration described there is obtained the same scanning action of an area of a test piece as was heretofore obtained only with a movable transducer.

In order to obtain a visual image of the acoustic image thus obtained, the receiving transducer is connected by way of amplifier 25 to an intensifier grid of an oscilloscope 40. The oscilloscope is provided with a horizontal sweep generator 41 controlling the sweep between horizontal plates 42 and with a vertical sweep generator 43 for controlling the sweep between vertical plates 44. The sweep generators are synchronized with the pulse transmission by synchronizer 16. The horizontal and vertical sweep generators are adjusted so that the sweep from A to B corresponds to the interval of time that it takes the beam to travel from the steps 1 to 8 of one column to the test material, and the number of vertical deflections of the sweep is correlated with the number of columns A to H. A single transmitted pulse completes a full scan from A-1 to H-8 before the succeeding pulse is applied to transducer 12. The frequency of the vertical sweep generator is the frequency of the horizontal sweep multiplied by the number of vertical columns in block 30. Therefore there will be obtained a visual image on the oscilloscope screen corresponding to the acoustic image received by the receiving transducer.

Having described our invention, what we claim and desire to secure by Letters Patent is:

1. A device for the ultrasonic inspection of an object, comprising a transmitting transducer spaced from the object on one side thereof, a receiving transducer spaced from the object on the other side thereof, periodic pulse generating means for energizing said transmitting transducer to produce an ultrasonic wave train, and means for causing said wave train to scan a given area of said object, said scanning means comprising a delay block interposed between the transmitting transducer and said object, said transducers, block and object being coupled by an acoustic couplant, the acoustic velocity in the delay block being different from the acoustic velocity in the couplant, said block being formed to provide a plurality of direct paths of varying time duration for transmitting the wave train through the block in the direction of wave train transmission, the form of said block comprising a plurality of adjacent rows of steps, the steps of each row providing paths of progressively varying time duration, the steps of each row continuing the step-by-step progression of the preceding adjacent row, and means for detecting the wave train energy received by the receiving transducer, said detecting means including an oscilloscope, a horizontal sweep generator and a vertical sweep generator for controlling the oscilloscope beam, means for synchronizing the pulse generating means and the sweep generators to form a sweep having vertical and horizontal components, the frequency of the vertical sweep generator being equal to the frequency of the horizontal sweep generator multiplied by the number of rows of steps in the delay block, and means for varying the oscilloscope beam in response to variations in energy received by the receiving transducer.

2. A device as specified in claim 1, in which the depth of each step is such that the time required for the acoustic wave train to travel such depth is equal to or greater than the time duration of the acoustic wave train.

3. A device as specified in claim 2, in which the direction of progression of steps in each row is opposite to the direction of progression of steps in the adjacent row.

4. A device as specified in claim 3, in which the beginning of each row is a step removed from the end of the adjacent row in the direction of progression.

References Cited in the file of this patent

UNITED STATES PATENTS

| | | |
|---|---|---|
| 2,448,352 | Carlin | Aug. 31, 1948 |
| 2,527,986 | Carlin | Oct. 31, 1950 |
| 2,565,725 | Frederick et al. | Aug. 28, 1951 |

FOREIGN PATENTS

| | | |
|---|---|---|
| 1,017,869 | France | Dec. 19, 1952 |